United States Patent
Yunger et al.

[11] Patent Number: 5,823,337
[45] Date of Patent: Oct. 20, 1998

[54] TACKLE BOX

[75] Inventors: Robert J. Yunger; James Schumaker, both of Plano, Ill.

[73] Assignee: Plano Molding Company, Plano, Ill.

[21] Appl. No.: 607,231

[22] Filed: Feb. 26, 1996

[51] Int. Cl.⁶ .................................................. A01K 97/06
[52] U.S. Cl. ....................... 206/315.11; 220/334; 43/54.1
[58] Field of Search ............................ 206/315.1, 315.11, 206/372, 373; 220/334, 335, 336; 43/54.1, 55

[56] References Cited

U.S. PATENT DOCUMENTS

| | | | |
|---|---|---|---|
| 3,250,427 | 5/1966 | Pogue | 220/335 X |
| 4,062,340 | 12/1977 | Huff | 220/335 X |
| 4,325,595 | 4/1982 | Solomon | 220/335 X |
| 5,033,617 | 7/1991 | Hartwein et al. | 206/209.1 X |
| 5,133,455 | 7/1992 | Chow | 206/373 X |
| 5,203,469 | 4/1993 | Chang et al. | 206/372 X |

*Primary Examiner*—Jacob K. Ackun
*Attorney, Agent, or Firm*—Richard A. Zachar; Jack D. Nimz

[57] ABSTRACT

A carrying case is provided comprising an outer shell of rigid material enclosing an interior storage compartment. The outer shell has a base section and a lid, the base section having a bottom wall with front, rear and spaced apart end walls upstanding therefrom. The lid has a top wall, with front, rear, and spaced apart end walls depending therefrom. A pair of pivot mounts are associated with the end walls of the base section to which the end walls of the lid are pivotally attached. The pivot mounts, rear wall of the lid, and rear wall of the base section cooperate to limit rotation of the lid to approximately 90 degrees from the closed position to the stable, fully open position. The rear wall of the lid is further inwardly contoured to provide a comfortable fit between the case and the body of a wearer when the wearer carries the case using a provided shoulder strap.

26 Claims, 2 Drawing Sheets

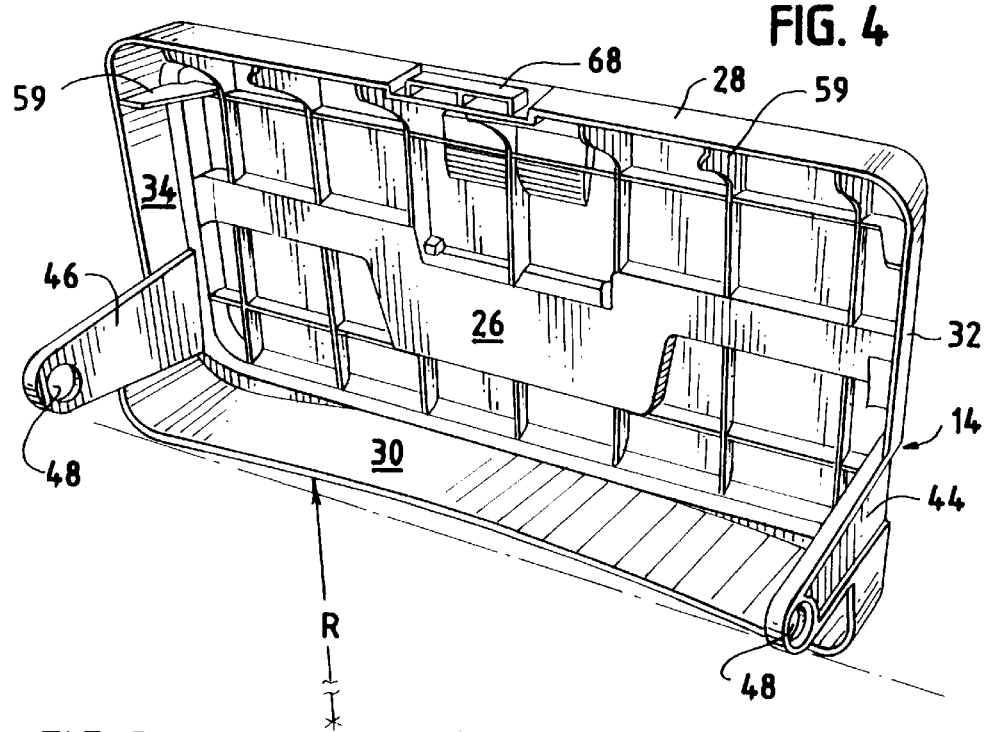
FIG. 4
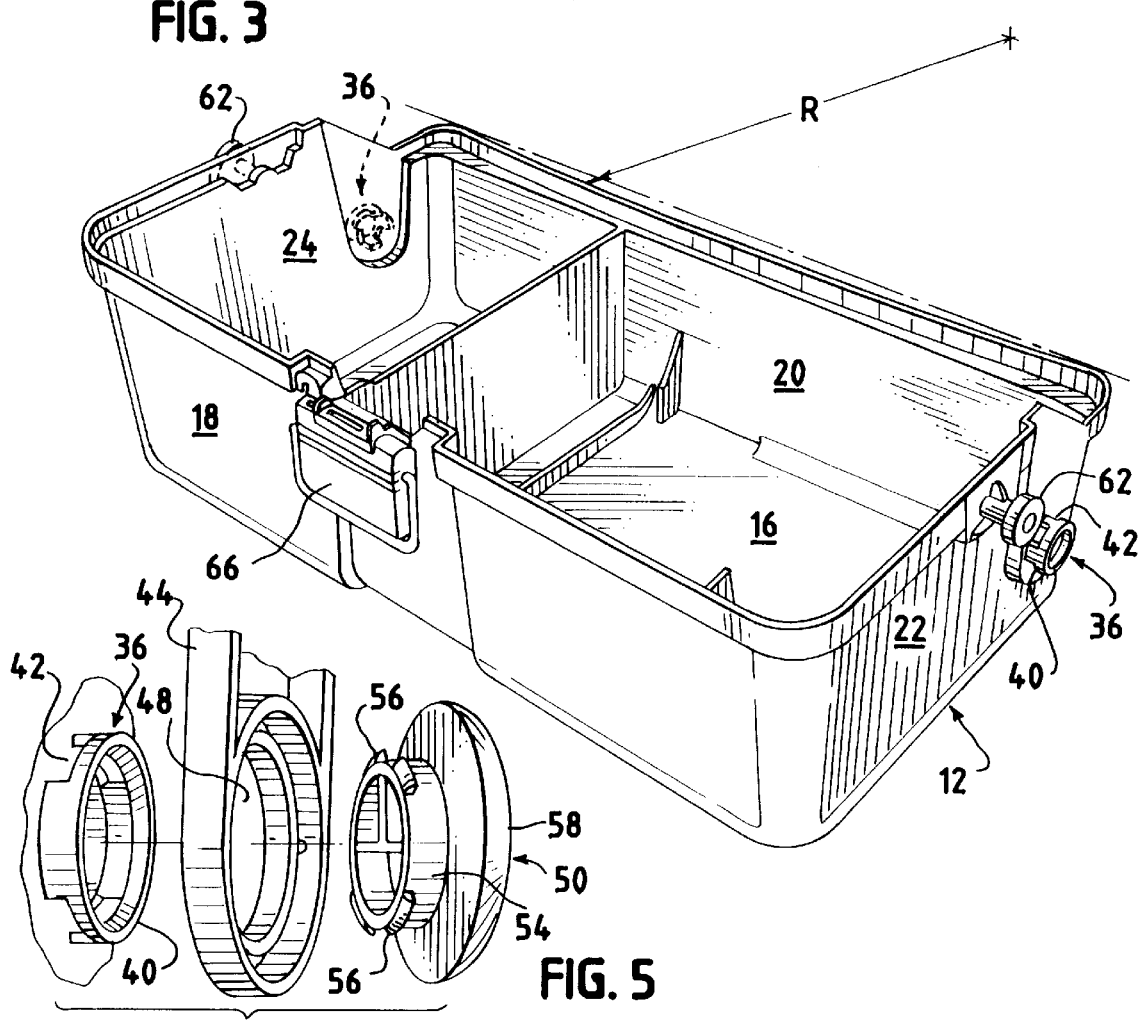
FIG. 3
FIG. 5

TACKLE BOX

BACKGROUND OF THE INVENTION

This invention relates generally to carrying cases and, more particularly, relates to an improved carrying case for use in the storage and transportation of fishing tackle, hunting and archery items, hardware items, and the like.

Standard box-shaped tackle boxes and hardware boxes made of rigid material include a base section for holding assorted fishing or hardware items and a lid hingedly connected to the lower section along the upper free end of the rear wall thereof. By reason of the hinge arrangement, the lid is able to swing freely through 180 degrees from a closed position to a fully opened position to expose the contents disposed therein. To achieve a stable open position, the face of the rear wall of the lid is required to abut the face of the rear wall of the base section whereafter the box undesirably occupies twice the area as compared to when the lid is closed. Furthermore, these boxes are conventionally designed to be carried by a handle affixed to the top wall of the lid. As such, rigid carrying cases of the type above-described suffer some disadvantages as compared to soft-sided cases made of canvas or other flexible material in that the latter cases may be comfortably carried by a shoulder strap in addition to a handle affixed to the case. Soft-sided cases, however, suffer obvious disadvantages as compared to the rigid cases such as, for example, providing less impact protection and less convenient access to the contents. Therefore, there remains an unfulfilled need for a case having the advantages normally associated with rigid cases in combination with the advantages normally associated with soft-sided cases, while minimizing or eliminating the drawbacks of each.

As a result of this existing need, it is an object of the present invention to provide a rigid carrying case with a traditional rectangular or box-like configuration which can be comfortably carried by a shoulder strap.

It is yet another object of the present invention to provide a rigid carrying case which, when carried by a strap, may be conveniently accessed in a manner similar to soft-sided cases.

It is a further object of the present invention to provide a rigid carrying case having a lid which may be moved to a stable, fully open position whereafter the contents of the case are fully exposed and the fully opened case occupies much less space than do traditional rigid cases when fully opened.

SUMMARY OF THE INVENTION

In accordance with the present invention, there is provided a rigid carrying case comprising an outer shell of rigid material enclosing an interior storage compartment. The outer shell has a base section and a lid, the base section having a bottom wall with front, rear and spaced apart end walls upstanding therefrom. The lid has a top wall, with front, rear, and spaced apart end walls depending therefrom. A pair of pivot mounts are associated with the end walls of the base section to which the end walls of the lid are pivotally attached. The pivot mounts, rear wall of the lid, and rear wall of the base section cooperate to limit rotation of the lid to approximately 90 degrees from the closed position to the stable, fully open position.

In the preferred embodiment, when the lid is closed, the rear wall of the lid slightly overlaps the upper exterior portion of the rear wall of the base section. The outer surface of the rear wall of the lid includes a smooth, slightly contoured face portion so that, when the case is carried by a shoulder strap which may be affixed to the end walls of the base section, the contoured face portion comfortably bears against the body of a person carrying the case and is provided further structural support by its engagement with the rear wall of the base section. Furthermore, the pivot mounts are disposed on each of the end walls of the base section approximately equidistant from the bottom of the rear wall and the top of the rear wall of the base section whereby the bottom edge of the rear wall of the lid is caused to abut the face of the rear wall of the base section proximate to the bottom thereof when the lid is rotated to the stable, fully open position.

A better understanding of the objects, advantages, features, properties and relationships of the invention will be obtained from the following detailed description and accompanying drawings which set forth an illustrative embodiment and is indicative of the various ways in which the principles of the invention may be employed.

BRIEF DESCRIPTION OF THE DRAWINGS

For a better understanding of the invention, reference may be had to the preferred embodiment shown in the following drawings in which:

FIG. 3 illustrates an isometric view of the base section of the carrying case depicted in FIG. 1;

FIG. 4 illustrates an isometric view of the lid of the carrying case depicted in FIG. 1; and FIG. 5 illustrates a partial, exploded view of the side of the carrying case depicted in FIG. 1 illustrating the attachment of the lid to the base section.

DETAILED DESCRIPTION

Figure 1:
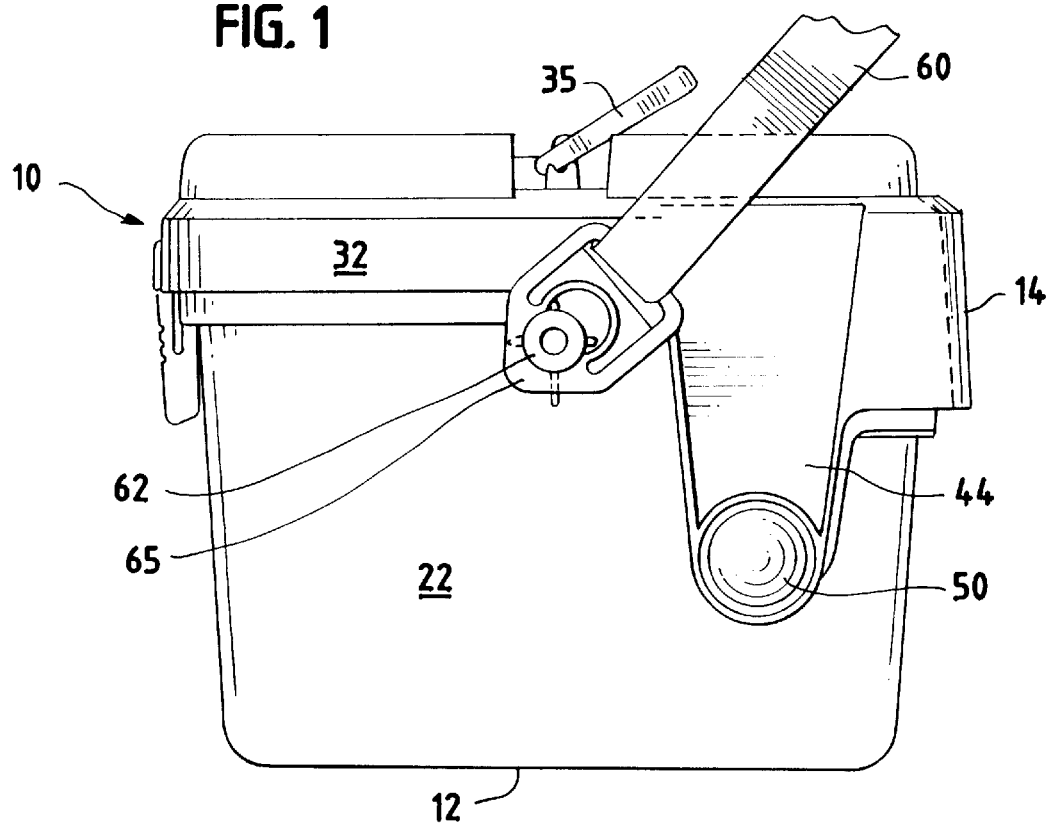
FIG. 1 illustrates a side view of a carrying case shown in the closed position.

While the invention can be used in conjunction with any carrying case it will be described hereinafter in the context of a rigid tackle or tool box as the preferred embodiment thereof.

Referring now to the Figures, wherein like reference numerals refer to like elements, there is illustrated a tackle box 10 having a rigid plastic shell comprised of a base section 12 and a lid 14. The base section 12 includes a bottom wall 16 from which extends upstanding front wall 18, rear wall 20, and spaced end walls 22,24. The base section 12 further includes in the interior thereof a plurality of compartments for use in maintaining trays which are provided to hold fishing tackle, tools or the like. Specifically, the compartments may be arranged to accept stackable, removable trays or may be arranged to support trays hingedly connected therewithin. The lid 14 includes a top wall 26 from which depends front wall 28, rear wall 30, and spaced end walls 32,34. The lid 14 may also be provided with a movable handle 35 which is preferably pivotally attached proximate to the center of the top wall 26 thereof.

Figure 2:
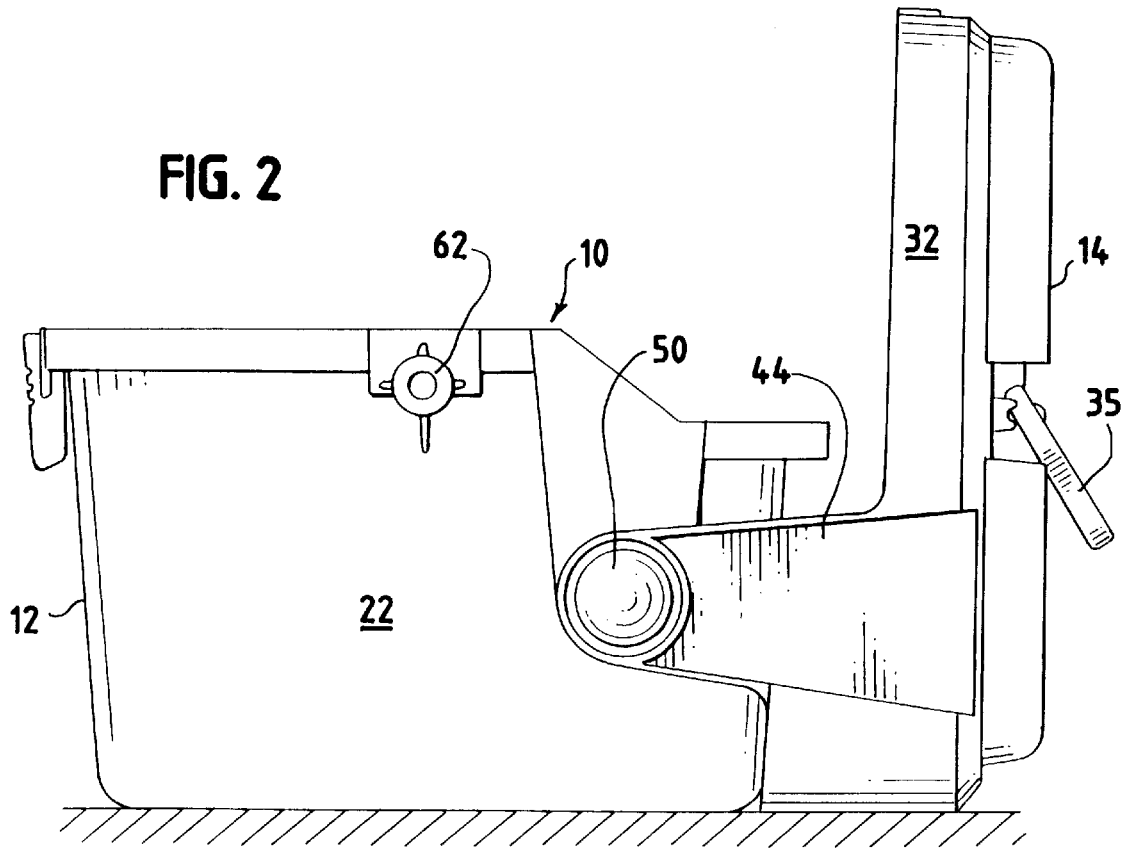
FIG. 2 illustrates a side view of the carrying case depicted in FIG. 1 in the open position.

As illustrated in FIGS. 1–2, the lid 14 is pivotally connected to the base section 12. Preferably, the pivotal connection of the lid 14 to the base section 12 is achieved through the use of axially aligned pivot mounts 36 which extend outwardly from the end walls 22,24 of the base section 12. The pivot mounts 36 each comprise an annular member 40 which includes a plurality of cutout portions 42.

Each of the pivot mounts 36 are provided to cooperate with a respective one of a pair of oppositely disposed arms 44,46 which depend one from each of the end walls 32,34 of the lid 14. Specifically, each of the arms 44,46 includes in the lower portion thereof a substantially circular opening 48 which is sized and configured to be rotatably disposed over the annular member 40 of the respective pivot mount 36.

A pair of hubs 50, illustrated in FIGS. 4–5, are further provided to secure the arms 44,46 over the respective pivot mounts 36 and include a substantially circular member 54 having extending from the lower end thereof a plurality of tabs 56. The circular member 54 of each of the hubs 50 is sized and configured to be accepted within the annular member 40 such that the tabs 56 align and mate with the corresponding cutout portions 42 for the purpose of securing the hubs 50 thereto. The upper end of the circular member 54 is further provided with a flange 58 which is sized larger than the circular opening 54 found in each of the arms 44,46 whereby each of the arms 44,46 will be secured between the flange 58 and the respective end walls 22,24 of the base section 12 when the arms 44,46 are disposed over the respective pivot mounts 36 and the hubs 50 are secured in place. As seen, this arrangement of pivot mounts 36 and cooperating arms 44,46 which rotate thereabout allow the lid 14 to be freely moved with respect to the base section 12.

In the closed position, illustrated in FIG. 1, the bottom of the lid 14 is sized and configured to overlappingly mate with the top of the base section 12 whereby the bottom of the interior faces of the front wall 28, rear wall 30, and end walls 32,34 of the lid 14 engage the top of the exterior faces of the front wall 18, rear wall 20 and end walls 22,24 of the base section 12. The interior of the lid 14 is provided with stops 59 which are used to support the lid 14 on the upper free edges of the walls of the base section 12 when in the closed position.

In the preferred embodiment, the rear wall 30 depends a slightly greater distance than do the front wall 28 and end walls 32,34 of the lid 14 while the rear wall 20 extends a slightly shorter distance than do the front wall 18 and end walls 32,34 of the base section 12 such that the exterior face of the rear wall 20 of the base section 12 engages the interior face of the rear wall 30 of the lid 14 approximately midway between the top wall 26 and bottom wall 16. In addition, the rear wall 30 of the lid 14 is provided with a slightly inwardly curved or contoured smooth exterior surface. Similarly, the upper portion of the rear wall 20 of the base section 12, proximate to the point of engagement with the rear wall 30 of the lid 14, is provided with a cooperating slightly inwardly curved or contoured surface for used in providing further structural support to the rear wall 30 of the lid 14 when in the engaged, closed position. The curved surfaces of the rear walls 20,30 and the positioning of the engagement therebetween is provided to comfortably and securely support the closed tackle box 10 against the body of a carrier when carried by a strap 60.

For use in releasably securing the strap 60 to the tackle box 10 a pair of axially aligned outwardly extending knobs 62 are provided on each of the end walls 22,24 of the base section 12 which are capable of securely engaging mating members 65 provided at the ends of the strap 60. It is preferred that the knobs 62 be positioned in the middle of the end walls 22,24 proximate to the location where the end walls 32,34 of the lid 14 overlappingly engage the end walls 22,24 of the base section 12 for allowing the tackle box 10 to be balanced when carried by the strap 60. This arrangement between the strap 60 and the knobs 62 allows the strap ends to pivot 360 degrees about the knobs 62 whereby the strap 60 may be angled toward the shoulder of the wearer at varying angles. A pull down latch 66 is further provided on the front wall 18 of the base section 12 and is engagable with a cooperating securing tab 68 positioned on the front wall 28 of the lid 14 for use in securing the lid 14 in closed relation to the base section 12.

In the preferred embodiment of the invention, the pivot mounts 36, the lid 14, and the base section 12 are sized and arranged to cooperate to limit the pivotal movement of the lid 14 to approximately 90 degrees from the closed position to the open position. Specifically, it is desired that the lid 14 and base section 12 be provided with cooperating abutting mechanisms and the pivot mounts 36 be positioned such that the lid is stabilized in a nearly vertical orientation when in the fully open position. More specifically, the pivot mounts 36 are preferably disposed approximately equidistant from the bottom and top of the rear wall 16 such that the bottom edge of the rear wall 30 of the lid 14 will engage the face of the rear wall 30 of the base section 12 proximate to the bottom wall 16 when placed in the fully open position. Such a configuration allows the lid 14 to be disposed in a nearly vertical position when in the fully open position whereby space required to fully open the lid to a stable position is minimized. Furthermore, it is preferred that when the lid 14 is positioned in the fully open position the face of the rear wall 30 of the lid 14 be disposed in substantially the same plane as the bottom wall 16 of the base section 12 whereby the rear wall 30 will be capable of engaging a surface on which the open tackle box 10 is disposed thereby providing the tackle box 10 with a further support or longer base to prevent the inadvertent tipping thereof. In addition, the arms 44,46 are preferrably vertically aligned as close as possible to the center of gravity of the lid 14 when the lid 14 is placed in the closed position whereby the center of gravity will quickly move out of supportive alignment with the arms 44,46 when the lid 14 is moved towards the open position whereafter the lid 14 will be urged to rotate rearwardly by the force of gravity into engagement with the base section 12.

In a further embodiment of the invention, the pivot mounts 36 are positioned closer to the top of the rear wall 20 than to the bottom of the rear wall 20 such that the bottom edge of the rear wall 30 of the lid 14 will engage the face of the rear wall 30 of the base section 12 when in the fully open position at a position distant from the bottom wall 16. This embodiment also functions to provide a box 10 which requires a smaller area to be fully, stably opened within. Similarly, it is also contemplated that the pivot mounts 36 could be arranged such that the bottom edge of the rear wall 30 of the lid 14 narrowly misses engaging the rear wall 20 of the base section 12 instead engaging the bottom wall 16 of the base section 12 proximate to the rear wall 20 to achieve the stable, fully open position. However, it is noted that these embodiments are less preferred for use in applications when the box 10 is to be placed on a supporting surface as such embodiments lack the added support provided by the engagement of the rear wall 30 of the lid 14 with both the supporting surface and the base section 12. As such, depending on the relative configurations and masses provided to the lid 14 and base section 12, the later described embodiments may be subjected to inadvertent tipping that the preferred embodiment should not experience.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

What is claimed is:

1. A rigid carrying case, comprising:

a base section having a bottom wall disposed substantially in a plane, and from which extends a front wall, rear wall, and spaced end walls;

a lid having a top wall from which depends a front wall, rear wall, and spaced end walls;

a pair of pivot mounts for pivotally connecting said end walls of said lid to said end walls of said base section;

wherein said pivot mounts, lid, and base section are cooperable to limit rotation of said lid from a closed position to an open position in which said rear wall of said lid is disposed substantially within said plane.

2. The rigid carrying case as recited in claim 1, wherein said lid in disposed in overlapping engagement with said base section when said lid is in said closed position.

3. The rigid carrying case as recited in claim 1, wherein a portion of said rear wall of said lid engages a portion of said rear wall of said base section when said lid is in said open position.

4. The rigid carrying case as recited in claim 3, wherein said portion of said rear wall of said lid comprises a portion of the bottom edge of said rear wall of said lid.

5. The rigid carrying case as recited in claim 4, wherein said portion of said rear wall of said base section comprises a portion of the face of said rear wall of said base section proximate to said bottom wall of said base section.

6. The rigid carrying case as recited in claim 5, wherein said pivot mounts are located in positions along said end walls of said base section approximately equidistant from the top and bottom edges of said rear wall of said base section.

7. The rigid carrying case as recited in claim 5, wherein said bottom wall of said base section lies substantially within a plane and said rear wall of said lid is disposed substantially within said plane when said lid is in said open position.

8. The rigid carrying case as recited in claim 7, wherein said lid is disposed in overlapping engagement with said base section when said lid is in said closed position.

9. The rigid carrying case as recited in claim 2, wherein said rear wall of said lid is provided with an inwardly curved, smooth surface.

10. The rigid carrying case as recited in claim 9, wherein a portion of said rear wall of said base section engages a portion of said rear wall of said lid for providing structural support thereto.

11. The rigid carrying case as recited in claim 10, wherein said portion of said rear wall of said base section is provided with an inwardly curved, smooth surface.

12. The rigid carrying case as recited in claim 9, wherein said rear wall of said lid depends a greater distance than do said side and end walls of said lid.

13. The rigid carrying case as recited in claim 12, wherein said rear wall of said base portion extends a shorter distance than do said side and end walls of said base section.

14. The rigid carrying case as recited in claim 13, wherein said bottom wall of said base section is substantially disposed in a plane and said rear wall of said lid is substantially disposed in said plane when said lid is in said open position.

15. The rigid carrying case as recited in claim 1, wherein said pivot mounts are substantially aligned along a plane which is disposed proximate to the center of gravity of said lid.

16. The rigid carrying case as recited in claim 15, wherein said pivot mounts comprise each of said end walls of said base section having an annular member extending therefrom and each of said end walls of said lid having an arm depending therefrom having an opening therethrough adapted to rotatably mate with a corresponding one of said annular members.

17. The rigid carrying case as recited in claim 16, wherein said pivot mounts further comprise a pair of hub portions adapted to mate with a corresponding one of annular members for rotatable securing said arms thereon.

18. A rigid carrying case, comprising:

a base section having a bottom wall from which extends a front wall, rear wall, and spaced end walls;

a lid having a top wall from which depends a front wall, contoured rear wall, and spaced end walls; and a pair of pivot mounts for pivotally connecting said end walls of said lid to said end walls of said base section whereby said lid may be moved between a substantially horizontal closed position and a substantially vertical open position;

wherein a portion of said lid is disposed in overlapping relation with a portion of said base section when said lid is in said closed position;

wherein said rear wall of said lid engages said rear wall of said base section when said lid is in said open position such that said rear wall of said lid is substantially disposed within a plane in which lies said bottom wall of said base section.

19. The carrying case as recited in claim 18, wherein said pivot mounts are positioned approximately equidistant from the top edge of said rear wall and the bottom edge of said rear wall of said bottom section.

20. The carrying case as recited in claim 18, wherein said rear wall of said lid depends a further distance than do said front and end walls of said lid and said rear wall of said base section extends a shorter distance than do said front and end walls of said base section.

21. The carrying case as recited in claim 18, further comprising a strap which may be releasably secured to the end walls of said base section.

22. A rigid carrying case, comprising:

a base section having a bottom wall from which extends a front wall, rear wall, and spaced end walls;

a lid having a top wall from which depends a front wall, contoured rear wall, and spaced end walls;

a pair of axially aligned annular members one each being disposed on a corresponding one of said end walls of said base member at a location substantially equidistant from the top edge and bottom edge of said rear wall of said base section; and a pair or arms depending one each from a corresponding one of said end walls of said lid each arm having an opening adapted to rotatably engage with one of said annular members whereby said lid may be rotatably moved thereabout between a substantially horizontal closed position and a substantially vertical open position;

wherein said rear wall of said lid engages said rear wall of said base section when said lid is in said open position such that said rear wall of said lid is substantially disposed within a plane in which lies said bottom wall of said base section;

wherein a lower portion of said rear wall of said lid overlappingly engages an upper portion of said rear wall of said base section at a location approximately midway between said top wall of said lid and said bottom wall of said base section when said lid in said closed position.

23. The carrying case as recited in claim 22, wherein said arms are disposed in a substantially vertical plane when said lid is in said closed position proximate to the center of gravity of said lid.

24. A rigid carrying case, comprising:

a base section having a bottom wall from which extends a front wall, rear wall, and spaced end walls;

a lid having a top wall from which depends a front wall, rear wall, and spaced end walls;

a pair of pivot mounts for pivotally connecting said end walls of said lid to said end walls of said base section;

wherein said pivot mounts, lid, and base section are cooperable to limit rotation of said lid from a substantially horizontal closed position to a substantially vertical open position and wherein a portion of the bottom edge of the rear wall of said lid engages a portion of the face of said rear wall of said base section proximate to said bottom wall of said base section when said lid is in said open position, and said bottom wall of said base section lies substantially within a plane and said rear wall of said lid is disposed substantially within said plane when said lid is in said open position.

25. The rigid carrying case as recited in claim 24, wherein said lid is disposed in overlapping engagement with said base section when said lid is in said closed position.

26. A rigid carrying case being supported on a planar surface, the carrying case comprising:

a base section having a bottom wall being supported on said planar surface, and from which extends a front wall, rear wall, and spaced end walls;

a lid having a top wall from which depends a front wall, rear wall, and spaced end walls;

a pair of pivot mounts for pivotally connecting said end walls of said lid to said end walls of said base section; and said pivot mounts, lid and base section being cooperable to allow rotation of said lid between a closed position in which the rear wall of the lid is spaced from said planar surface and an open position in which at least a portion of the rear wall of said lid is in abutment with said planar surface and said rear wall of said lid is disposed substantially parallel to said planar surface, when the bottom wall of the base section is supported on said planar surface.

* * * * *